(12) United States Patent
Fair et al.

(10) Patent No.: US 8,177,423 B1
(45) Date of Patent: May 15, 2012

(54) THERMAL HISTORY SENSOR UTILIZING ELECTRICAL CONDUCTIVITY AND MAGNETIC PERMEABILITY

(75) Inventors: Geoff E. Fair, Centerville, OH (US); Triplicane A. Parthasarathy, Beavercreek, OH (US); Ronald J. Kerans, Yellow Springs, OH (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 409 days.

(21) Appl. No.: 12/154,809

(22) Filed: May 19, 2008

Related U.S. Application Data

(60) Provisional application No. 60/938,881, filed on May 18, 2007.

(51) Int. Cl.
*G01K 3/00* (2006.01)
*G01N 25/00* (2006.01)
*G01D 21/00* (2006.01)

(52) U.S. Cl. .......... 374/106; 374/44; 374/102; 116/207; 116/216

(58) Field of Classification Search ................. 374/102, 374/44, 106; 116/207, 206
See application file for complete search history.

(56) References Cited

U.S. PATENT DOCUMENTS

| | | | |
|---|---|---|---|
| 5,975,758 A | 11/1999 | Yokota et al. | |
| 6,974,249 B1 | 12/2005 | Fair et al. | |
| 7,080,939 B1 | 7/2006 | Fair et al. | |
| 2008/0187021 A1* | 8/2008 | Haarer et al. | ................. 374/102 |

* cited by examiner

*Primary Examiner* — Lisa Caputo
*Assistant Examiner* — Mirellys Jagan
(74) *Attorney, Agent, or Firm* — AFMCLO/JAZ; Rebecca Greendyke

(57) ABSTRACT

The present invention provides a thermal history sensor having a plurality of substrates positioned adjacent to an item. The substrates include different compositions, such that the substrates respond to thermal exposures with different changes in electrical conductivity or magnetic permeability. By measuring the electrical or magnetic properties of the substrates following thermal exposure, information about the thermal history may be obtained.

20 Claims, 2 Drawing Sheets

Thermal exposure

THERMAL HISTORY SENSOR UTILIZING ELECTRICAL CONDUCTIVITY AND MAGNETIC PERMEABILITY

CROSS-REFERENCE TO RELATED APPLICATION

The present application relates to and claims priority to U.S. Provisional Patent Application No. 60/938,881 filed May 18, 2007. The contents of U.S. Provisional Patent Application No. 60/938,881 are hereby incorporated by reference.

RIGHTS OF THE GOVERNMENT

The invention described herein may be manufactured and used by or for the Government of the United States for all governmental purposes without the payment of any royalty.

FIELD OF THE INVENTION

The present invention relates to the detection of undesirable thermal excursions, and more particularly, relates to determining the thermal history of goods and materials.

BACKGROUND OF THE INVENTION

When undesirable thermal excursions occur during the service of products/components, the useful life of the product is reduced. Proper retirement of components or withdrawal of products that experience undesirable thermal excursions prevents failures that could result in loss of life or significant financial loss. For materials such as foods, drugs, electronic components, munitions, and other perishable goods, detection of such excursions allows thermally degraded goods to be identified and removed from use thereby avoiding malfunctions, customer dissatisfaction, and potential lawsuits.

Most products and materials are restricted in allowable thermal excursions. For example, in aircraft, spacecraft and other industrial products, components are designed for use within a certain temperature range. Deviations from the designed allowable temperature range may alter the material, causing degradation in properties leading to increased risk of component failure and reduced lifetime. Knowledge of the thermal history helps in proper retirement withdrawal, in learning causes of undesirable thermal history which might be avoided in future, and in developing a better understanding of failures which might help develop better materials.

While temperature overshoots can hurt the life of any material, excursions into certain critical temperature ranges below the operating temperature are also known to affect the life in certain materials. Such materials include SiC/BN/SiC composites which suffer oxidation-induced loss in properties and intermetallic compounds including $MoSi_2$ which suffers from "pesting", a phenomenon of enhanced oxidation in the intermediate temperature regime of 600-1000° C.

In other products, thermal fluctuations beyond the allowed range will degrade the product with no obvious indications. For example, materials such as foods, drugs, electronic components, munitions, and other perishable goods can spoil or degrade due to inadvertent thermal exposure during production, shipping, handling, or on the shelf at the retailer. As a consequence of spoilage and degradation, the materials are no longer usable or marketable resulting in losses to producers and retailers and in the inability to use the materials by the consumer.

Attempts have been made to obtain more information about the time of exposure at a given temperature. For example, U.S. Pat. No. 5,975,758 to Yokota et al. discloses a method and sensor for detecting the thermal history of a specimen. The sensor is made up of a pair of electrodes, a diffusion layer of insulating material disposed between the electrodes, and an electrically conductive metal. The electrodes are electrically isolated from each other in the beginning. As the sensor experiences thermal exposure, the electrically conductive metal diffuses into the diffusion layer, thereby changing the resistance of the diffusion layer. When in use, the sensor is placed in or near the atmosphere to which the specimen is exposed. In response to temperature, the electrically conductive metal diffuses into the diffusion layer to such an extent that the electrical resistance across the electrodes extremely decreases after a certain period of time. Thus, it is possible to detect the deterioration of life of the specimen by monitoring the change in electrical resistance of the sensor.

While some inventions have been made to determine thermal history, there exists a need for a simple device capable of monitoring the thermal history of such materials to assure quality and prevent spoilage and degradation. In particular, the device should be capable of identifying detrimental thermal exposures and identifying when such exposures occurred.

SUMMARY OF THE INVENTION

The present invention provides a thermal history sensor which uses the variation in conductivity or magnetic permeability of materials containing conductive or magnetically permeable phases which change upon thermal exposure. The measurement is made easily after the exposure is completed. The sensor includes an array of sensing elements, each of which is a different material that changes electrical conductivity or magnetic permeability in response to thermal exposure. The change in properties arise due to precipitation of a conductive phase, oxidation of a conducting or magnetically permeable phase to a non-conducting phase, or phase separation destroying the continuity of the conductive phase (the rate and extent of which is directly proportional to the temperature of exposure). The use of an array of sensing elements provides for the measured conductivities to be used as a "fingerprint" for each thermal history, during which the individual elements undergo changes in conductivity or magnetic permeability to different extents. The present invention uses an array of materials which differ in their response to thermal history and measure the conductivity or magnetic permeability of the array elements after exposure. The conductivity or magnetic permeability "fingerprint" can then be matched to a database of known fingerprints generated in the laboratory or through computer modeling to identify the thermal history.

Versions of the present invention designed for high temperature operation may be used to monitor components operating at high temperatures in turbine and rocket engines, thermal protection systems, refractory materials processing, and power generation including nuclear power. Materials in these applications are designed for use within a certain temperature range. Deviations from this range may result in compromised properties and component failures. Knowledge of the thermal history is crucial to determining useful remaining lifetimes of such components. Versions of the device designed for low temperature operation are useful to determine spoilage and thermal degradation of military foodstuffs, medicines, electronics, and munitions as a consequence of thermal exposure in production, storage, shipping, and use.

In accordance with one aspect of the invention, there is provided a thermal history sensor including a plurality of substrates positioned adjacent to an item. The plurality of substrates includes different compositions, wherein the substrates respond to thermal exposures with different changes in electrical conductivity or magnetic permeability.

The thermal history sensor may also include a backing material on which the plurality of substrates are disposed. Alternatively, the plurality of substrates may be sandwiched in a coverplate. The backing material and coverplate may include an attachment means for securing the thermal history sensor adjacent to the item. Moreover, the thermal history sensor may include 4 to 36 substrates.

In accordance with another aspect of the present invention, a method for obtaining the thermal history of an item is provided. The method includes positioning at least one thermal history sensor adjacent to the item, exposing the item and the at least one thermal history sensor to a thermal stressor, measuring changes in the electrical conductivities or magnetic permeabilities of the substrates, combining the measurements of changes in the electrical conductivities or magnetic permeabilities of each of the substrates to form a thermal history fingerprint, and comparing the thermal history fingerprint to baseline data for the item.

The method may include the step of attaching the at least one thermal history sensor to the item with an attachment means. The method may also include the step comparing the thermal history fingerprint to baseline fingerprints searchable in a computer database. Furthermore, the method may include the step of removing the at least one thermal history sensor from the item after the at least one thermal history sensor is exposed to the thermal stressor.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF THE INVENTION

The thermal history sensor of the present invention is based on the principle that several measurable properties of materials change significantly with time at temperature. The time and temperature dependencies of the property changes are identical to those that cause degradation of materials in a component, or products such as foods and drug. The degradation rate is linear in time and exponential in temperature in most cases. As such, the invention includes several combinations of material designs and measurement methods which produce a sensor that detects thermal history and predicts material degradation extent.

Exemplary thermal history sensors of the present invention include measurements of electrical resistivity/conductivity, magnetic permeability, dielectric constants, piezo-electric constants, optical fluorescence, and thermal conductivity. The essence of the invention is the same in all these cases. That is, the thermal history sensor is a material having two interpenetrating constituents, one of which has a high value and the other a low value of the measured property. Further, one of the constituents, typically the matrix (continuous phase), is stable upon thermal exposure, while the other suffers degradation within the temperature range of use of the sensor. The measured value of the property of the composite sensor is thus a quantitative indicator of the degree of degradation of the second constituent. This is used to back out the thermal history. The properties and the measurement methods are well known in the art and are not repeated in detail herein.

Figure 1:
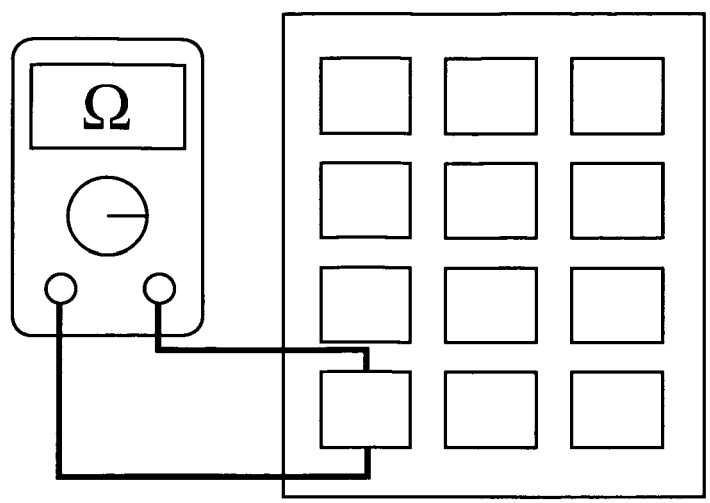
FIG. 1 is an exemplary thermal history sensor of the present invention.
Figure 2:
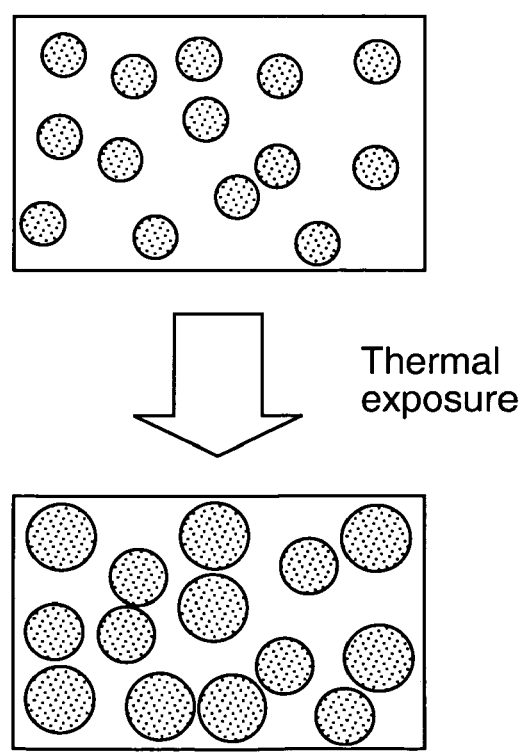
FIG. 2 illustrates a change in sensor properties from thermal exposure.

In one exemplary embodiment, the thermal history sensor utilizes electrical conductivity to determine thermal history. Referring to FIG. 1, a thermal history sensor includes a plurality of sensing elements attached to a conductive or non-conductive backing or sandwiched between a coverplate which provides encapsulation against the environment. The elements, for example, may be <1 mm thick and 5 mm×5 mm square. The sensor is attached to a component/perishable item (or any object in which thermal history is to be measured) using any available means, such as adhesive or fasteners. The plurality of sensing elements includes different materials which undergo different changes in conductivity upon thermal exposure. FIG. 2 shows the material of one element prior to thermal exposure (top view) and after thermal exposure (bottom view).

After being attached to a component/item, the sensor would then be thermally exposed resulting in a change in conductivity of the sensing elements. Following thermal exposure, the sensor would be removed from the component or material being monitored, and the conductivity of each sensing element recorded by direct or indirect means. The conductivity measurement can be made in several ways. For example, the measurement may be a direct contact measurement in which electrical leads are connected to each sensing element. Alternatively, the measurement may be non-contact in which the conductivity is made using eddy currents. The measurement may also be indirect and non-contact in which the sensing elements are inductively heated and the temperature change in the material recorded using thermography (the conductivity of the material is then inferred from these results). By measuring the conductivity of the different materials of the sensing elements, a thermal history fingerprint can be generated. The thermal history fingerprint is then used to identify the thermal exposure utilizing a pattern matching algorithm and a database of fingerprints of known thermal exposures.

Figure 3A:
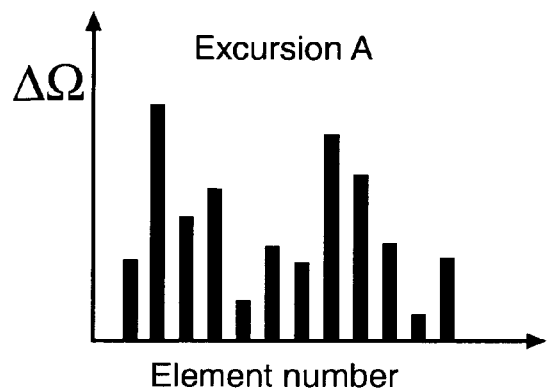
FIGS. 3A and 3B show "fingerprints" of a thermal history sensor following temperature excursions A and B, respectively.
Figure 3B:
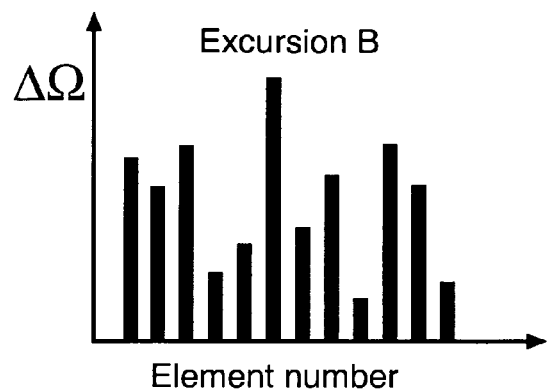
Figure 4A:
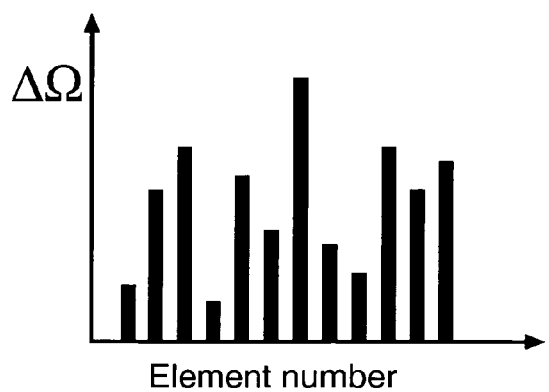
FIGS. 4A and 4B illustrate a comparison of "fingerprints" of a thermal history sensor and control data.
Figure 4B:
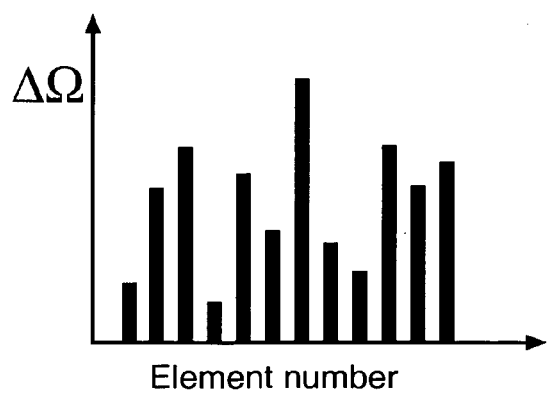

In FIG. 3A, a sensor was exposed to thermal excursion A. Each sensing element of the sensor underwent a change in conductivity, and the measurement of that conductivity is shown on the bar chart. Likewise, FIG. 3B illustrates the conductivity measurements of another sensor which was exposed to thermal excursion B. The resulting patterns of conductivities are fingerprints corresponding to the thermal history of the sensor/component. Using a data table of conductivity measurements or, more simply, a computer with an appropriate pattern-matching algorithm, the fingerprints are read and matched to the correct thermal history. This will require that a database of known thermal history fingerprints be generated either in the laboratory or through computer modeling. FIG. 4A shows a thermal fingerprint of a sensor which matches the thermal fingerprint of a known excursion (FIG. 4B).

It is noted that it is not necessary to assess the actual amount of conducting phase as a consequence of the thermal excursions. It is only necessary that the measurements be repeatable and that, as a group, the conductivities of the sensing elements are unique to a particular thermal history.

The electrical conductivity-based sensor features the use of the variation in electrical conductivity of materials with thermal exposure to enable detection of the major features of thermal history of the materials that may occur during service. One example of such a system is devitrification of Si—C—O glasses. In this embodiment, several commercially available Si—C—O materials (e.g. Blackglas™) and fibers (e.g. Nicalon™ and Tyranno™) are processed to yield an amorphous material with low electrical conductivity. Upon heating to high temperatures in inert atmosphere, the amorphous material crystallizes. The rate and extent of crystallization is directly proportional to the temperature of exposure. The crystallization process yields SiC crystals and, in some cases, precipitates excess C. Both phases are good conductors compared to the amorphous matrix thereby increasing the conductivity of the material. Excursions to temperatures in the range of 1000-1400° C. can be monitored.

Another example is oxidation of conducting phases in porous oxide ceramics. In this embodiment, particles or fibers of conducting materials such as C, Mo, Cr, V, etc. may be incorporated into oxide ceramics ($Al_2O_3$, etc.) in sufficient quantity to produce a conductive composite material. Upon exposure to air at high temperatures, the conducting phases may burn away, evaporate, or oxidize to a non-conducting oxide. The rate of material loss or oxidation is directly proportional to the temperature of exposure. The loss or oxidation of the conducting phase leads to a decrease in conductivity of the material. Excursions to temperatures in the range of 400-1000° C. can be monitored. The material loss with time is linear in the case of evaporation, but parabolic in the case of oxidation. Combining the two types results in greater accuracy.

In a further example, a thermal history sensor includes phase separation of polymer blends containing a conductive polymer. In this embodiment, conductive polymers such as polyaniline-(camphor sulfonic acid) (PANI-CSA) can be dissolved into an insulating polymer such as polymethylmethacrylate (PMMA) in sufficient quantity to yield a conductive composite. The composite solution of PANI-CSA/PMMA can itself be blended with solutions of other polymeric materials such as polystyrene or polycarbonate at temperatures above the melting temperature and quenched to yield a conductive glass. Upon subsequent heating to temperatures between the glass transition temperature, $T_g$, and the crystalline melting temperature, $T_m$, the glass will phase separate. The degree and rate of phase separation is directly proportional to the temperature of exposure. Phase separation results in the break up of a continuous conductive phase leading to a decrease in conductivity. Excursions to temperatures in the range of 25-200° C. can be monitored.

In another exemplary embodiment of the present invention, the thermal history sensor utilizes magnetic permeability to determine thermal history. Like the previous sensor utilizing electrical conductivity, this thermal history sensor includes a plurality of sensing elements attached to a conductive or non-conductive backing or sandwiched between a coverplate which provides encapsulation against the environment. The elements, for example, may be <1 mm thick and 5 mm×5 mm square. The sensor is attached to a component/perishable item (or any object in which thermal history is to be measured) using any available means. The plurality of sensing elements includes different materials which undergo different changes in magnetic permeability upon thermal exposure.

After being attached to a component/item, the sensor would then be thermally exposed resulting in some change in magnetic permeability of the sensing elements. Following thermal exposure, the sensor would be removed from the component or material being monitored, and the magnetic permeability of each sensing element recorded by direct or indirect means. The magnetic permeability measurement can be made in various ways. The magnetic permeability measurement may be made using the Faraday method in which the magnetic material is suspended from one arm of a balance into an inhomogenous magnetic field. The force exerted on the material is directly proportional to the magnetic susceptibility of the material as well as the volume of material tested, the field strength, and gradient in field strength.

The magnetic permeability is directly proportional to the magnetic susceptibility of the material. The remnant magnetization may be measured by exposing the material to an induction field of increasing strength, by passing a current through a solenoid coil until the magnetization, as measured in a secondary coil with a flux meter, of the material saturates. The induction field can then be removed and the remnant magnetization determined using the secondary coil. By measuring the magnetic permeability of the different materials of the sensing elements a thermal history fingerprint can be generated. The thermal history fingerprint is then used to identify the thermal exposure utilizing a pattern matching algorithm and a database of fingerprints of known thermal exposures.

It is noted that it is not necessary to assess the actual amount of magnetic phase as a consequence of the thermal excursions. It is only necessary that the measurements be repeatable and that, as a group, the permeabilities and/or remnant magnetizations of the sensing elements are unique to a particular thermal history.

The magnetic permeability of several material systems is known to correlate with the amount of magnetic phase present. The magnetic material may initially be present and then decrease in concentration by chemical or environmental reaction. The rates of chemical reactions are known to be temperature dependent; consequently, the amount of magnetic phase reacted will be dependent on the thermal history of the material.

One example of a magnetic permeability system is oxidation of metallic ferromagnetic materials. In this embodiment, metallic elements such as Fe, Ni, Co, and Gd as well as their alloys (Fe—Si, Fe—Ni, Fe—Ni—Co—B, etc.) are ferromagnetic. Application of an induction magnetic field induces a remnant magnetization in these materials. Upon thermal exposure, the magnetization decreases and is lost above the Curie temperature of the materials. Thermal exposure in oxidizing environments causes oxidation of the materials to less- or non-magnetic phases (Fe→Fe2O3). Following thermal exposure, the remnant magnetization can be measured as well as the amount of magnetization that can be induced in the material. As a consequence of thermal exposure in oxidizing atmospheres, both quantities will decrease in proportion to the temperature and time. Thermal excursions in the temperature range of 200-800° C. can be monitored.

While various descriptions of the present invention are described above, it should be understood that the various features can be used singly or in any combination thereof. Therefore, this invention is not to be limited to only the specifically preferred embodiments depicted herein. Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. A thermal history sensor comprising:
a plurality of separate sensing elements positioned adjacent to an item, each of said sensing elements comprising different noncontinuous material that undergoes a permanent alteration upon thermal exposure, so that each sensing element experiences a different time-dependent change in electrical conductivity based on a temperature-dependent change in an amount of each different noncontinuous material in each sensing element in response to thermal exposures to provide a thermal history of the item, wherein said thermal history sensor is configured such that the different time-dependent change in electrical conductivity is measured after the thermal exposures occur.

2. The thermal history sensor of claim 1, wherein said plurality of sensing elements includes about 4 to 36 sensing elements.

3. The thermal history sensor of claim 1, wherein the plurality of sensing elements experience different changes in electrical conductivity at temperatures ranging from about 25° C. to about 1400° C. or greater.

4. The thermal history sensor of claim 1, wherein the different changes in electrical conductivity of each sensing element provide a unique thermal fingerprint of the thermal history of the item.

5. The thermal history sensor of claim 1, further comprising a backing material, said plurality of sensing elements disposed on said backing material.

6. The thermal history sensor of claim 5, further comprising an attachment means for securing said backing material adjacent to the item.

7. The thermal history sensor of claim 1, further comprising a coverplate, said plurality of sensing elements sandwiched within said coverplate.

8. The thermal history sensor of claim 7, further comprising an attachment means for securing said coverplate adjacent to the item.

9. The thermal history sensor of claim 1, wherein the different noncontinuous material comprises different Si—C—O materials that crystallize at different rates and different temperatures to increase the electrical conductivity of each of said sensing element by different amounts upon thermal exposure.

10. The thermal history sensor of claim 9, wherein the Si—C—O materials include Blackglas™, Nicalon™, and Tyranno™ that experience changes in electrical conductivity at temperatures of about 1,000° C. to about 1,400° C.

11. The thermal history sensor of claim 1, wherein the different noncontinuous material comprises oxide ceramics and different conductive materials that dissipate at different rates and different temperatures to decrease the conductivity of each of said sensing element by different amounts upon thermal exposure.

12. The thermal history sensor of claim 11, wherein the different conductive materials include C, Mo, Cr, V and the oxide ceramics include $Al_2O_3$ that experience changes in electrical conductivity at temperatures of about 400° C. to about 1000° C.

13. The thermal history sensor of claim 1, wherein the different noncontinuous material comprises different conductive polymers that undergo phase separation at different rates and different temperatures to decrease the electrical conductivity of each of said sensing element by different amounts upon thermal exposure.

14. The thermal history sensor of claim 13, wherein the different conductive polymers include camphor sulfonic acids that experience changes in electrical conductivity at temperatures of about 25° C. to about 200° C.

15. A method for obtaining the thermal history of an item using the thermal history sensor of claim 1, the method comprising:
positioning at least one thermal history sensor adjacent to the item;
exposing the item and said at least one thermal history sensor to a thermal stressor, wherein said sensing elements undergo a permanent alteration upon exposure to the thermal stressor;
measuring time-dependent changes in the electrical conductivities of said sensing elements after exposure to the thermal stressor;
combining the measurements of changes in the electrical conductivities of each of said sensing elements to form a thermal history fingerprint; and
comparing the thermal history fingerprint to baseline data for the item,
wherein said sensing elements comprise different Si—C—O materials that increase the electrical conductivity of each of said sensing elements by different amounts upon thermal exposure, different conducting materials that decrease the electrical conductivity of each of said sensing elements by different amounts upon thermal exposure, and/or different conductive polymers that decrease the electrical conductivity of each of said sensing elements by different amounts upon thermal exposure.

16. The method of claim 15, wherein said step of positioning said at least one thermal history sensor adjacent to the item includes attaching said at least one thermal history sensor to the item with an attachment means.

17. The method of claim 15, wherein said step of comparing the thermal history fingerprint to baseline data for the item includes comparing the thermal history fingerprint to baseline fingerprints searchable in a computer database.

18. The method of claim 15, further comprising the step of removing said at least one thermal history sensor from the item after said at least one thermal history sensor is exposed to the thermal stressor.

19. The method of claim 15, wherein the step of measuring changes in the electrical conductivities of said sensing elements comprises a direct contact measurement, a non-contact measurement, or an indirect, non-contact measurement.

20. The method of claim 15, further wherein the different Si—C—O materials crystallize at different rates and different temperatures to increase the electrical conductivity of each of said sensing elements by different amounts upon thermal exposure, the different conducting materials dissipate at different rates and different temperatures to decrease the electrical conductivity of each of said sensing elements by different amounts upon thermal exposure, and the different conductive polymers undergo phase separation at different rates and different temperatures to decrease the electrical conductivity of each of said sensing elements by different amounts upon thermal exposure.

* * * * *